(12) United States Patent
Beyagudem et al.

(10) Patent No.: US 10,628,863 B2
(45) Date of Patent: *Apr. 21, 2020

(54) PURCHASING RECOMMENDATIONS BASED ON EXPIRATION VERSUS CONSUMPTION BEHAVIOR

(71) Applicant: International Business Machines Corporation, Armonk, NY (US)

(72) Inventors: Santosh K. Beyagudem, Cary, NC (US); Marit L. Imsdahl, Cary, NC (US); Austyn N. Laures, Durham, NC (US); Alexandra D. Markello, Fayetteville, NC (US); Edna Y. Morales, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,465

(22) Filed: Aug. 28, 2018

(65) Prior Publication Data

US 2018/0365745 A1    Dec. 20, 2018

Related U.S. Application Data

(63) Continuation of application No. 14/929,840, filed on Nov. 2, 2015, now Pat. No. 10,127,586.

(51) Int. Cl.
*G06Q 30/00* (2012.01)
*G06Q 30/06* (2012.01)

(52) U.S. Cl.
CPC ..... *G06Q 30/0607* (2013.01); *G06Q 30/0631* (2013.01)

(58) Field of Classification Search
CPC ................................................. G06Q 30/06–08
(Continued)

(56) References Cited

U.S. PATENT DOCUMENTS 6,965,871 B1   11/2005   Szabo et al.
6,982,640 B2    1/2006   Lindsay et al.
(Continued)

FOREIGN PATENT DOCUMENTS

CN           202549174 U      11/2012

OTHER PUBLICATIONS

Joo, K.H. et al.,"Design and Implementation of an Agent-Based Grocery Shopping System", IEICE Trans. Inf. & Syst. vol. E83, No. 11, Nov. 2000, pp. 1-12.
(Continued)

*Primary Examiner* — Ethan D Civan
(74) *Attorney, Agent, or Firm* — Cantor Colburn LLP; Alexander Jochym

(57) ABSTRACT

Aspects relate to methods, systems, and processes related to providing purchasing recommendations to a consumer including tracking and recording, by a processor, perishable product input related to a perishable product, tracking and recording consumption information related to the perishable product and the consumer, tracking and recording waste information related to the perishable product and the consumer, and providing a purchasing recommendation to the consumer based on the recorded perishable product input, the consumption information, and the waste information.

20 Claims, 3 Drawing Sheets

(58) Field of Classification Search
USPC .............................................. 705/26.1–27.2
See application file for complete search history.

(56) References Cited

U.S. PATENT DOCUMENTS

| | | | |
|---|---|---|---|
| 7,644,017 B2 | 1/2010 | Pippia et al. | |
| 10,127,586 B2* | 11/2018 | Beyagudem | ....... G06Q 30/0631 |
| 2012/0101876 A1 | 4/2012 | Turvey et al. | |
| 2012/0278190 A1 | 11/2012 | Brown | |
| 2013/0138656 A1 | 5/2013 | Wheaton | |
| 2014/0165614 A1 | 6/2014 | Manning et al. | |
| 2015/0019373 A1 | 1/2015 | Carbonell et al. | |
| 2015/0112759 A1 | 4/2015 | Hong et al. | |
| 2017/0124613 A1 | 5/2017 | Beyagudem et al. | |

OTHER PUBLICATIONS

List of IBM Patents or Patent Applications Treated as Related; Date Filed: Aug. 28, 2018; 2 pages.

* cited by examiner

PURCHASING RECOMMENDATIONS BASED ON EXPIRATION VERSUS CONSUMPTION BEHAVIOR

DOMESTIC PRIORITY

This application is a continuation of U.S. application Ser. No. 14/929,840, titled "PURCHASING RECOMMENDATIONS BASED ON EXPIRATION VERSUS CONSUMPTION BEHAVIOR" filed Nov. 2, 2015, the contents of which are incorporated by reference herein in its entirety.

BACKGROUND

The present disclosure relates generally to purchasing recommendations and, more specifically, to purchasing recommendations based on expiration versus consumption behavior.

The shelf-life of perishable products pertains to the date at which it is expected the perishable product to become spoiled despite the operation of a refrigerator or other perishable product storage device. To alert a consumer of the expiration date of a particular perishable product, often the packaging or labeling of the perishable product includes a printed indication of the expiration date of the product. Even with known expiration dates, consumers may discard unconsumed food items that have exceeded the shelf-life of the item due to lack of consumption (e.g., the consumer didn't want to consume the perishable product or it expired prior to the consumer wanting to consume the perishable product).

Smart home technologies act to avoid the unnecessary waste of perishable products. In this regard, basic smart refrigerators can be programmed by a consumer to alert the consumer when a particular product has exceeded its shelf-life. More advanced smart refrigerators can provide for optical scanning or wireless sensing of perishable products' expiration date directly from information included with the product packaging. Even more advanced smart refrigerators may cooperate with smart containers to achieve the automated tracking of food product expiration dates. Of note, smart refrigerators can include embedded computing systems, or smart refrigerators can be conventional refrigerators with coupled computing systems.

Smart food containers may be equipped with communicative sensors that can interact with a reader attached to the refrigerator, and connect to a touchscreen. Whenever a container is used and stored in the refrigerator, the container can be scanned, recognized, and the user can be prompted to enter information related to the contents of the container into an associated computer system. Based on the information and refrigerator settings, software can calculate how long the perishable product will remain edible. Of note, smart refrigerators further can be permitted remote access to data related thereto or stored thereon, for example the data may be accessed from a mobile device so that when a consumer shops at the grocery store, the consumer can determine in real time perishable products to purchase based on low stock reports and/or expiration dates obtained from the smart refrigerator.

SUMMARY

According to embodiments, a method, system, and computer program product are provided for providing purchasing recommendations to a consumer including tracking and recording, by a processor, perishable product input related to a perishable product, tracking and recording consumption information related to the perishable product and the consumer, tracking and recording waste information related to the perishable product and the consumer, and providing a purchasing recommendation to the consumer based on the recorded perishable product input, the consumption information, and the waste information.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein are provided to monitor the type and quantity of perishable products that expire before the products are consumed. Systems and methods provided herein track when each item of a perishable product is first introduced (e.g., bought and put into a refrigerator), the perishable product's expiration date according to its packaging, and when the perishable product is consumed or thrown away. Based on logic and processing of the systems described herein, the system may subsequently make recommendations for future purchases based on a user's consumption versus the expiration date of the perishable products. As used herein, perishable products may include, but are not limited to, food, toiletries, paper goods, plants, etc.

As described herein, recommendations on purchasing perishable products may provide recommendations for purchasing different quantities of perishable products, purchasing based on a different time schedule, and/or purchasing a similar product with a longer shelf life. As such, the recommendations may provide an optimized purchasing habit for a user based on the habits of the user, both with respect to the perishable products the user obtains and also on the habits of the consumer (e.g., when and what to purchase).

Some solutions center around alerting consumers that their products are about to expire, serving as a reminder so that the consumer can consume the perishable product prior to expiration of the product. The solutions may also allow consumers to check the expiration data status when they are at the grocery store, i.e., remotely or remote from home, so that the consumer knows whether or not the consumer will need to purchase more of a particular perishable product because the product the consumer has at home will expire soon (or has expired). In these cases, the consumer may be prompted to alter the consumer's behavior (i.e., consuming or restocking perishable products about to expire) based on the contents of their fridge.

In accordance with embodiments described herein, the contents of a consumer's refrigerator may be altered (due to purchasing recommendations) as a result of the consumer's behavior (i.e. frequency and time they are eating particular foods). Thus, the consumer may not have to make changes to use up more of the perishable products already purchased so that the perishable products do not expire. Further, the consumer may not have to throw away as many perishable products, because, due to the recommendations, there may be less of a perishable product that the consumer may usually throw out, thus reducing waste and optimizing the perishable products a consumer buys and minimizing the consumer's wasted perishable products.

Figure 1:
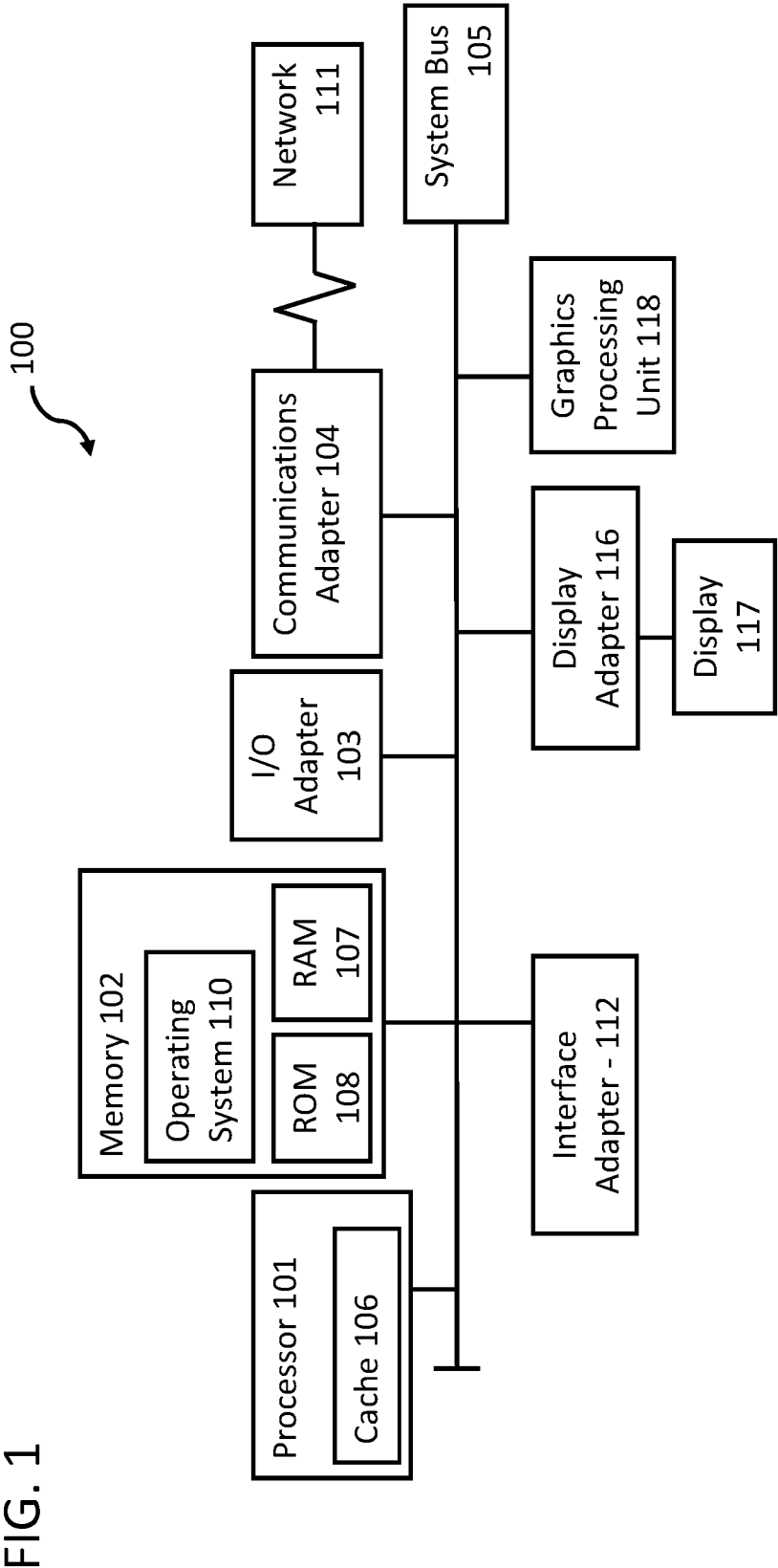
FIG. 1 illustrates a block diagram of a computer system for use in practicing the teachings herein.

FIG. 1 illustrates a block diagram of a computing system 100 (hereafter "system 100") for use in practicing the embodiments described herein. The methods described herein can be implemented in hardware, software (e.g., firmware), or a combination thereof. In an exemplary embodiment, the methods described herein may be implemented in hardware, and may be part of the microprocessor of a special or general-purpose digital computing system, such as a smart refrigerator, personal computer, workstation, minicomputer, or other computing device. The system 100 therefore can embody a general-purpose computing system. In another exemplary embodiment, the methods described herein may be implemented as part of a mobile device, such as, for example, a mobile phone, a personal data assistant (PDA), a tablet computer, etc.

In the non-limiting embodiment of FIG. 1, in terms of hardware architecture, the system 100 includes a processor 101. The system 100 also includes memory 102 coupled to the processor 101, and one or more input and/or output (I/O) adapters 103, that may be communicatively coupled via a local system bus 105. The memory 102 may be operatively coupled to one or more internal or external memory devices accessed through a network 111. A communications adapter 104 may operatively connect the system 100 to through the network 111. The system bus 105 may also connect one or more user interfaces via interface adapter 112. Interface adapter 112 may connect a plurality of user interfaces to the system 100 including, for example, touch screens (e.g., part of a display 117), keyboard, mouse, speaker, etc., that may be part of the system 100. In one non-limiting example, the interface adapter 112 may enable a consumer to input data through a touch screen on a smart refrigerator. The system bus 105 may also connect a display adapter 116 and a display 117 to the processor 101. The processor 101 may also be operatively connected to a graphical processing unit 118 used for displaying images and/or information on the display 117 and provide for a user interface on the display 117.

The processor 101 may be a hardware device for executing hardware instructions or software that may be stored in a non-transitory computer-readable memory (e.g., memory 102) or provided from an external source through the network 111. The processor 101 can be any custom made or commercially available processor, a central processing unit (CPU), a plurality of CPUs, an auxiliary processor among several other processors associated with the system 100, a semiconductor based microprocessor (in the form of a microchip or chip set), a macroprocessor, or generally any device for executing instructions. The processor 101 can include a memory cache 106.

The memory 102 can include random access memory (RAM) 107 and read only memory (ROM) 108. The RAM 107 can be any one or combination of volatile memory elements (e.g., DRAM, SRAM, SDRAM, etc.). The ROM 108 can include any one or more non-volatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, the memory 102 may incorporate electronic, magnetic, optical, and/or other types of non-transitory computer-readable storage media. As will be appreciated by those of skill in the art, the memory 102 can have a distributed architecture, where various components are situated remote from one another, but can be accessed by the processor 101.

The instructions in the memory 102 may include one or more separate programs, each of which comprises an ordered listing of computer-executable instructions for implementing logical functions. In the example of FIG. 1, the instructions in the memory 102 may include a suitable operating system 110. The operating system 110 can control the execution of other computer programs and provide scheduling, input-output control, file and data management, memory management, and communication control, and related services. For example, the operating system 110 may be an operating system for a smart refrigerator that includes the processor 101 and other associated components as shown and described in system 100.

The I/O adapter 103 can be, for example but not limited to, one or more buses or other wired or wireless connections, as is known in the art. The I/O adapter 103 may have additional elements, which are omitted for simplicity, such as controllers, buffers (caches), drivers, repeaters, and receivers, to enable communications.

The interface adapter 112 may be configured to operatively connect one or more I/O devices to the system 100. For example, in some configurations, the interface adapter 112 may connect a conventional keyboard and mouse. Other output devices, e.g., a speaker, may be operatively connected to interface adapter 112. Other output devices may also be included, although not shown. For example, devices may include but are not limited to a printer, a scanner, microphone, and/or the like. The I/O devices connectable to the interface adapter 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. Further, the interface adapter 112 may enable communication with one or more electronic devices, such as over Bluetooth or other near-field communications protocol.

The system 100 can further include a display adapter 116 coupled to one or more displays 117. In a non-limiting embodiment, the system 100 can further include a communications adapter 104 for coupling to a network 111.

The network 111 can be an IP-based network for communication between system 100 and any external device(s). The network 111 enables transmissions of data between the system 100 and external systems. In a non-limiting embodiment, the network 111 can be a managed IP network administered by a service provider. The network 111 may be implemented in a wireless fashion, e.g., using wireless protocols and technologies, such as WiFi, WiMax, etc. The network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

In some embodiments, the instructions in the memory 102 may further include a basic input output system (BIOS) (omitted for simplicity). The BIOS is a set of essential routines that initialize and test hardware at startup, start the operating system 110, and support the transfer of data among the operatively connected hardware devices. The BIOS may be stored in the ROM 108 so that the BIOS can be executed when the system 100 is activated. When the system 100 is in operation, the processor 101 may be configured to execute instructions stored within the memory 102, to communicate data to and from the memory 102, and to generally control operations of the system 100 pursuant to the instructions.

Figure 2:
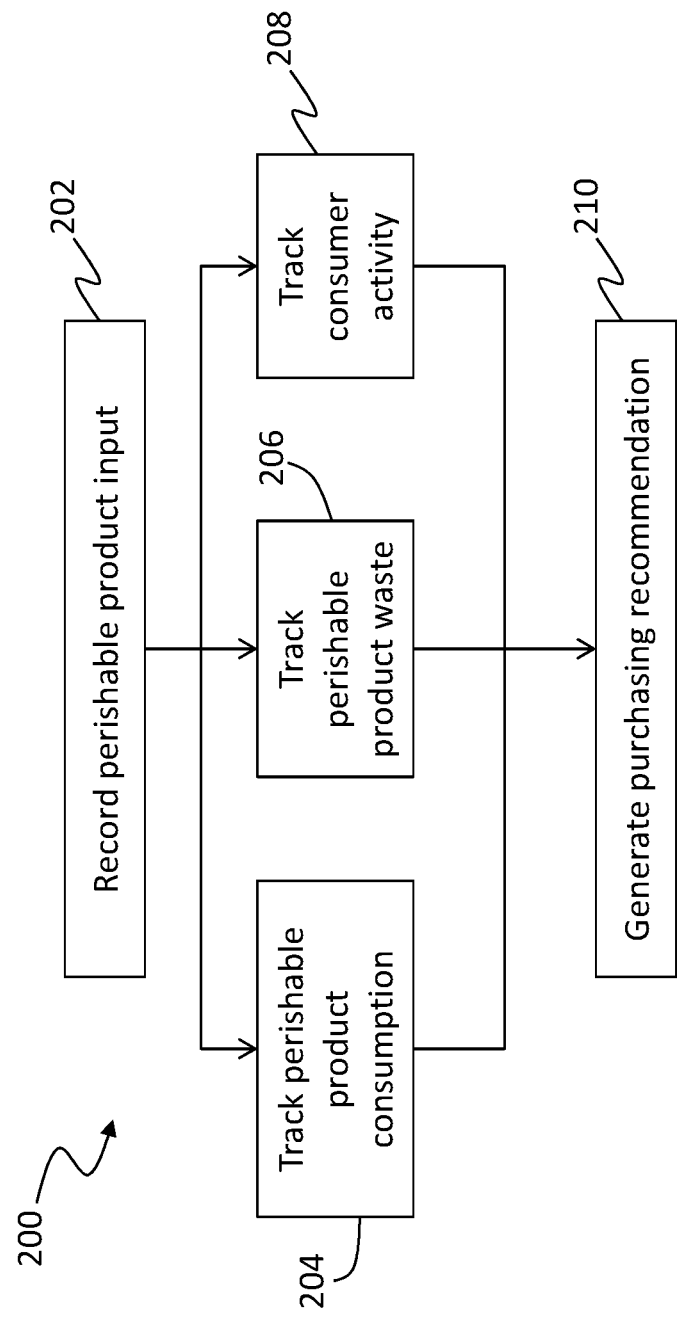
FIG. 2 is a flow process to provide purchasing recommendations to a consumer in accordance with a non-limiting embodiment of the present disclosure.

Turning now to FIG. 2, a flow process in accordance with a non-limiting embodiment of the present disclosure is shown. The flow process 200 may be a process that is performed by a smart refrigerator or other device, such as that shown and described with respect to FIG. 1, which may track the input, consumption, and waste of perishable items. As a result of tracking perishable products, embodiments described herein may provide a consumer with a recommendation for purchasing perishable products in the future. The process begins with a consumer purchasing perishable products, such as food items that have expiration dates prior to which the food items should be consumed. As will be appreciated by those of skill in the art, the perishable products are not limited to food items, but may include any product that may be consumed, and in some embodiments may be directed any product that a consumer or user may consume, including, but not limited to, toiletries, paper goods, plants, etc.

As shown at block 202, the system may record perishable product input. For example, the system may track the type and/or quantity of perishable products that are input into a refrigerator and when the perishable product is input into the refrigerator. The perishable product input may include expiration date information, such that the system may track when a perishable product is expected to expire, i.e., when the perishable product should be consumed or discarded due to the expiration date passing. Further, the perishable product input may include time information (e.g., date, time) the perishable product is input into the system.

The perishable product input information may be obtained by scanning a barcode on the perishable product and/or may be obtained by an RFID tag or wireless data transfer protocol. In some embodiments, a consumer may manually enter information for various perishable products. For example, a loaf of bread may have a bar code or RFID tag that can automatically enable input of quantity, type, and date. However, a consumer may enter information about a number of produce items that are purchased individually, such as apples, carrots, lettuce heads, etc. and/or meats that may be purchased from a deli.

As shown at block 204, the system may track the consumption of the perishable products. For example, each time a consumer removes a portion of a perishable product from the refrigerator the system may log an entry that the perishable product was consumed by the consumer. This may be tracked as consumption information. The consumption information may include the time and/or date when a particular perishable product or portion thereof is consumed. The consumption information may further include, for example, the type, quantity, amount, and date of when the perishable products are consumed.

In some embodiments, the consumption may be assumed based on removal of the perishable product from the refrigerator prior to an expiration date or a modified expiration date. A modified expiration date may be a date that is influenced and/or determined based on a consumer's personal preferences and habits. For example, a particular consumer may throw out food prior to the written/recorded expiration date, because of a particular consumer preference. As such, the input data at block 202 may be modified based on the consumer's preference. For example, a consumer may throw away milk at the first scent of potential spoliation, although the expiration date has not been reached. Similarly, in an opposite example, a consumer may allow a perishable product to remain in use after the written/recorded expiration date. For example, if a cheese exceeds the written expiration date, but does not get moldy, the consumer may continue to consume the cheese after the written expiration date. That is, as noted, the input data at block 202 may be modified based on the consumer's habits and/or preferences.

As shown at block 206, the system may also track the waste that is generated in the form of perishable products that are discarded or thrown away without being consumed by the consumer. For example, each time a consumer removes a portion of the perishable product from the refrigerator the system may log an entry that the perishable product was thrown out by the consumer, and thus the perishable product was wasted. The waste information may include, for example, date, quantity, and type of perishable product that is wasted. Similar to the consumption data described above, in some embodiments, the waste data of block 206 may be based on an expiration date of a perishable product recorded in the input data (block 202) or may be based on a modified expiration that is influenced by a consumer's preferences and/or habits.

The tracking performed in blocks 204 and 206 may track quantity, consumption dates as compared to expiration dates, and other information. In some embodiments, in addition to or alternatively, the system may request consumer input when a perishable product is consumed and/or discarded. For example, a consumer may manually input information related to quantity or amount of a perishable product that is consumed.

At block 208, the system may also track a consumer's habits and activity, as related to the perishable products. For example, the system may track when a consumer does not consume any perishable products. That is, the system may be configured to determine that a consumer did not eat at home, and thus no perishable products were consumed on a particular date. Alternatively, or in addition to automatic tracking, the system may track consumer activity based on consumer input into the system. For example, a consumer may enter into the system that the consumer eats away from home or orders delivery and/or take-out, and thus does not consume food from the refrigerator, and thus no perishable products are consumed.

Further, for example, the consumer's habits tracked at block 208 may include a consumer's preferences regarding when food is disposed of, such as described above with respect to modified expiration dates. As will be appreciated by those of skill in the art, the information tracked at blocks 204 and 206 may thus be used for tracking consumer activity, habits, and/or preferences.

From the information collected at blocks 202-208, the system may obtain a complete picture of a consumer's habits related to perishable products. For example, over time, the system may learn how much of a perishable product is consumed and wasted, and from this, the system can generate a recommendation for when a consumer should purchase perishable products.

For example, as shown at block 210, the system may generate and provide a purchasing recommendation for the consumer. That is, based on the data collected of what the consumer eats versus what the consumer throws away (blocks 204-208), the system makes purchasing recommendations to the user.

The recommendation at block 210 may provide recommendations to a consumer to adjust the consumer's purchasing habits. For example, based on the data collected at blocks 204-208, the system may recommend changing when certain perishable products are purchased, or substitutions or alternatives may be recommended, to thus improve, i.e., minimize, the consumer's waste of perishable products. The recommendations may include recommendations regarding type of perishable product to be purchased (e.g., substitutes and/or alternatives), quantity of perishable product to be purchased, when perishable products should be purchased, and/or frequency of purchasing perishable products.

Figure 3:
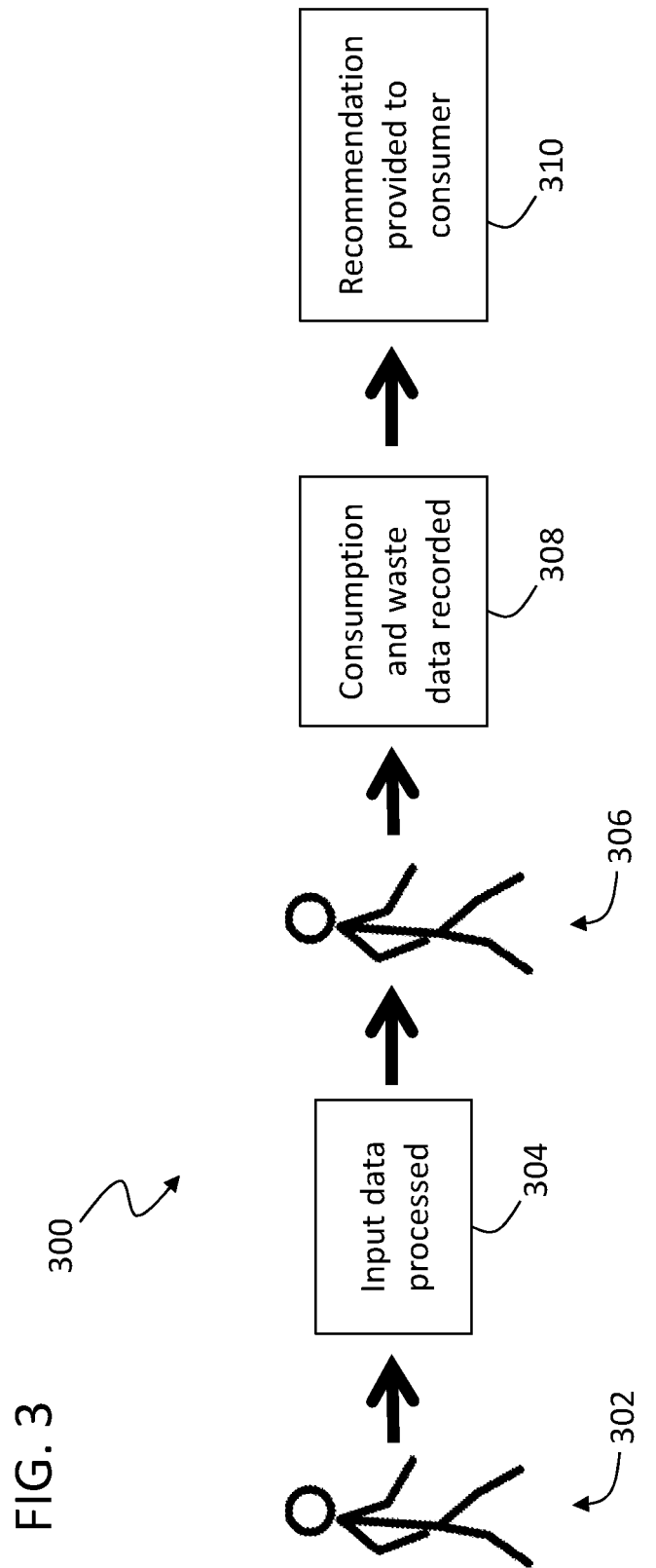
FIG. 3 is a schematic illustration of a use scenario of methods and systems in accordance with non-limiting embodiments of the present disclosure.

Turning now to FIG. 3, an example use case in accordance with a non-limiting embodiment of the present disclosure is shown. A consumer may buy four bags of carrots at 302, for example on a Sunday. The system 300 will process input data at 304. For example, the system may record the date the four bags of carrots are input into a refrigerator. Further, the system may record the expiration date of the bags of carrots, e.g., Saturday of the same week.

At 306, the consumer consumes one of the four bags of carrots by Saturday, and thus prior to the expiration date of the bags of carrots. At 308, the system records information related to the consumption and waste of the bags of carrots. For example, the consumption data is recorded that one bag is consumed and the waste information is recorded that three bags of carrots are expired and thus thrown out.

At 310 the system provides a recommendation to the consumer to purchase a lower number of bags of carrots each week. That is, based on the habits of the consumer, i.e., purchasing habits (four bags of carrots), consumption habits (one bag of carrots), and waste habits (three bags of carrots), the system may recommend an adjustment of the consumer's purchasing habits. For example, the system may recommend that the consumer purchase one fourth the total number of carrots that usually buy. This may assist the consumer in maximizing and optimizing their shopping while minimizing the amount of waste the consumer generates.

Referring again to FIG. 3, another example case use in accordance with a non-limiting embodiment of the present disclosure. In this example, a consumer may go shopping every Sunday and buy seven lettuce heads, at 302. When the seven heads of lettuce are input into the refrigerator, the system records the quantity of the lettuce heads and their expiration date, at 304. The consumer may then eat one head of lettuce per day, at 306, with consumption data recorded as each head of lettuce is consumed, at 308. On Friday night, the consumer may have two lettuce heads remaining, but they may have exceeded the expiration date and thus gone bad. Thus, on Friday, the system may record waste data related to two heads of lettuce that are thrown out, at 308. The system may then provide a recommendation to the consumer regarding lettuce purchasing, at 310. For example, the system may make a recommendation that the consumer (1) buy a lower quantity of lettuce heads on Sunday and (2) that the consumer make an additional grocery store trip mid-week to get more lettuce heads. Thus, in this example, the system may recommend to the consumer to buy four heads of lettuce on Sunday and then return to the store on Thursday and buy three heads of lettuce.

As described herein, the system may provide recommendations to a consumer based on the habits of the consumer. As noted, the system may track input data, consumption information, waste information, consumer specific information (e.g., habits, preferences, etc.). From this, the system may determine a recommendation and provide it to the consumer such that fewer perishable products are wasted. Although described in two specific use scenarios, those of skill in the art will appreciate that any number or types of perishable products may be tracked simultaneously, and appropriate recommendations for each type of perishable product that the consumer purchases and consumer may be provided by the systems and processes described herein.

Further, as noted, in addition to tracking the perishable products directly (e.g., just expiration date), systems and processes described herein may incorporate consumer habits as well. For example, if a consumer eats out (i.e., doesn't consume any perishable products) every Tuesday, the system may recommend adjustment to when the consumer should go grocery shopping and/or the system may recommend adjustment to the amount of particular perishable products the consumer should purchase.

In further embodiments, the system as described herein may further make recommendations about the specific product that is purchased. For example, if a consumer purchases a gallon of milk once a week, but only consumes two thirds of the milk, rather than suggesting an additional trip to the grocery store, the system may recommend purchasing a different type of milk. For example, almond milk may have a longer shelf-life, and thus, the system may recommend the consumer purchasing a gallon of almond milk once a week instead of regular milk.

Similarly, the system may make recommendations for a consumer to purchase frozen perishable products as compared to a fresh perishable product. For example, if the consumer regularly uses peas, but when buying peas fresh the consumer wastes a portion of the peas, the system may recommend the consumer to purchase frozen peas as a substitute such that the consumer does not waste as much of a fresh product. In some embodiments, the recommendations may be impacted by a consumer's preferences.

For example, a consumer may input into the system any allergies or other preferences related to perishable products. For example, a consumer may wish to only purchase fresh or organic perishable products, and thus the system may be configured to not make recommendations that are contrary to the consumer's preferences. That is, in the above example regarding the frozen peas, depending on a consumer's preferences, the system may not make a recommendation of a frozen substitute because the consumer does not wish to have any frozen equivalents. Similarly, if a consumer has a particular allergy, the system may be configured not to make recommendations that include products that contain the allergen.

Technical effects and benefits include providing recommendations to a consumer based on purchasing and consumption habits of perishable products, such that the consumer's purchasing is optimized while the consumer's waste is minimized or eliminated. Technical effects include altering the contents of a consumer's fridge due to the purchasing recommendations provided herein as a result of the consumer's behavior (e.g., the frequency and time the consumer is eating particular foods). Thus a consumer may not have to make changes to use up more of the consumer's perishable products so that they do not expire, nor will the consumer have to throw away as much perishable products, because, ultimately, there will be less of the perishable products that the consumer usually throws out.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to provide purchasing recommendations to a consumer via a refrigerator, wherein the refrigerator includes a processor and a RFID reader, the method comprising:
    obtaining, by the RFID reader of the refrigerator, perishable food product input related to a perishable food product, and waste information related to the perishable food product and the consumer;
    tracking and recording, by the processor of the refrigerator, the perishable food product input obtained by the RFID reader;
    tracking and recording, by the processor of the refrigerator, the waste information related to the consumer and a portion of the perishable food product that was discarded without being consumed by the consumer, wherein the waste information comprises a date of when the portion of the perishable food product was discarded, a quantity of the portion of the perishable food product that was discarded, and a type of the portion of the perishable food product that was discarded; and
    providing, by the processor of the refrigerator, a purchasing recommendation to the consumer based on the recorded perishable product input and the waste information.

2. The computer implemented method of claim 1, wherein the perishable food product input comprises an expiration date of the perishable food product, a quantity of the perishable food product, a type of the perishable food product, and when the perishable food product is input.

3. The computer implemented method of claim 1, further comprising tracking and recording consumption information related to the perishable food product and the consumer.

4. The computer implemented method of claim 3, wherein the consumption information comprises a date of consumption of the perishable food product, a quantity of the perishable food product consumed, and a type of the perishable food product consumed.

5. The computer implemented method of claim 1, wherein the purchasing recommendation comprises at least a recommendation to purchase more of the perishable food product.

6. The computer implemented method of claim 1, wherein the purchasing recommendation comprises at least one of a recommendation to purchase less of the perishable food product, a recommendation to purchase a substitute or alternative to the food perishable product, or a recommendation to purchase the perishable food product at a different time or frequency.

7. The computer implemented method of claim 1, further comprising recording one or more habits or preferences of the consumer related to the perishable food product, wherein the purchasing recommendation is further based on the one or more habits or preferences.

8. A refrigerator comprising:
    an RFID reader configured to obtain perishable food product input related to a perishable food product, and waste information related to the perishable food product and the consumer;
    a memory having computer readable instructions; and
    a processor configured to execute the computer readable instructions, the computer readable instructions comprising:
        tracking and recording the perishable food product input obtained by the RFID reader;
        tracking and recording the waste information related to the consumer and a portion of the perishable food product that was discarded without being consumed by the consumer, wherein the waste information comprises a date of when the portion of the perishable food product was discarded, a quantity of the portion of the perishable food product that was discarded, and a type of the portion of the perishable food product that was discarded; and
        providing a purchasing recommendation to the consumer based on the recorded perishable food product input and the waste information.

9. The refrigerator of claim 8, wherein the perishable food product input comprises an expiration date of the perishable food product, a quantity of the perishable food product, a type of the perishable food product, and when the perishable food product is input.

10. The refrigerator of claim 8, the computer readable instructions further comprising tracking and recording consumption information related to the perishable food product and the consumer.

11. The refrigerator of claim 10, wherein the consumption information comprises a date of consumption of the perishable food product, a quantity of the perishable food product consumed, and a type of the perishable food product consumed.

12. The refrigerator of claim 8, wherein the purchasing recommendation comprises a recommendation to purchase more of the perishable food product.

13. The refrigerator of claim 8, wherein the purchasing recommendation comprises at least one of a recommendation to purchase less of the perishable food product, a recommendation to purchase a substitute or alternative to the food perishable product, or a recommendation to purchase the perishable food product at a different time or frequency.

14. The refrigerator of claim 8, the computer readable instructions further comprising recording one or more habits or preferences of the consumer related to the perishable food product, wherein the purchasing recommendation is further based on the recorded one or more habits or preferences.

15. A computer program product to provide purchasing recommendations to a consumer via a refrigerator comprising a processor and a RFID reader, the computer program product comprising a computer readable storage medium having program instructions embodied therewith, the program instructions executable by the processor of the refrigerator to cause the processor to:
track and record perishable food product input related to a perishable food product, wherein the perishable food product input is obtained by the RFID reader of the refrigerator;
track and record waste information related to the consumer and a portion of the perishable food product that was discarded without being consumed by the consumer, wherein the waste information comprises a date of when the portion of the perishable food product was discarded, a quantity of the portion of the perishable food product that was discarded, and a type of the portion of the perishable food product that was discarded, wherein the waste information is obtained by the RFID reader of the refrigerator; and
provide a purchasing recommendation to the consumer based on the recorded perishable food product input and the waste information.

16. The computer program product of claim 15, wherein the perishable food product input comprises an expiration date of the perishable food product, a quantity of the perishable food product, a type of the perishable food product, and when the perishable food product is input.

17. The computer program product of claim 15, wherein the program instructions executable by the processor of the refrigerator further cause the processor to track and record consumption information related to the perishable food product and the consumer.

18. The computer program product of claim 17, wherein the consumption information comprises a date of consumption of the perishable food product, a quantity of the perishable food product consumed, and a type of the perishable food product consumed.

19. The computer program product of claim 15, wherein the purchasing recommendation comprises at least one of a recommendation to purchase more of the perishable food product, a recommendation to purchase less of the perishable food product, a recommendation to purchase a substitute or alternative to the perishable food product, or a recommendation to purchase the perishable food product at a different time.

20. The computer program product of claim 15, program instructions executable by the processor of the refrigerator further cause the processor to record one or more habits or preferences of the consumer related to the perishable food product, wherein the purchasing recommendation is further based on the recorded one or more habits or preferences.

* * * * *